UNITED STATES PATENT OFFICE.

KARL ALBERT FREDRIK HIORTH, OF CHRISTIANIA, NORWAY.

PROCESS OF REFINING IRON OR STEEL.

1,028,070.  Specification of Letters Patent.  Patented May 28, 1912.

No Drawing.  Application filed October 25, 1911.  Serial No. 656,710.

*To all whom it may concern:*

Be it known that I, KARL ALBERT FREDRIK HIORTH, a subject of the King of Norway, residing at Christiania, Norway, have invented certain new and useful Improvements in Processes of Refining Iron and Steel; and I do hereby declare the following to be a full, clear, and exact description of the invention, such as will enable others skilled in the art to which it appertains to make and use the same.

This invention relates to an improved process of refining iron and steel especially characterized by the fact that by a special treatment the slag employed in the dephosphorization is rendered useful as a slag for the finishing part of the refining process so that the preparation of fresh slag for each stage of the process and for each fresh charge is avoided as much as possible. Thereby is attained economy in the use of fluxing materials as well as in the use of heat, the necessity of employing a special furnace for each step of the refining process being at the same time avoided. Further is avoided the time-wasting raking out of the slag.

The process may preferably be carried out in the following manner: The melt produced in the usual way, is first dephosphorized for instance by adding ore or by blowing in the presence of a basic slag. The phosphorus is thereby driven into the slag so that the contents of phosphorus in the iron will be reduced for instance from 0.06 or more down to 0.008 per cent. The iron thus obtained and which is practically free of phosphorus is now poured into a ladle or similar receptacle, either completely, or so that a smaller or larger remainder of iron remains in the furnace together with the slag containing phosphorus. When choosing the method of pouring off the iron completely a suitable quantity of cheap iron or other metal is poured from a cupola furnace or the like into the furnace. The charge in the furnace now consisting of some iron or other metal together with slag containing phosphorus is then treated with coal or other deoxidizer so that the phosphorus is reduced off and taken up in the molten metal below. The quantity of iron rich in phosphorus that may have been obtained in this manner, is a valuable product which may for instance be used in the basic Bessemer process. This iron is poured off whereupon the iron obtained by the abovementioned dephosphorization process is poured back from the ladle (or other receptacle) into the furnace. Additions or special treatments that may be desired, may be carried out while the iron is in the ladle. The treatment of the iron poured into the furnace and which is free of phosphorus may then be completed and the iron freed from gases under the action of the slag, that is free of phosphorus and which may afterward be used again with a new charge, and so on.

The process described may of course be modified in various ways, as regards the mode of carrying out the same; thus instead of pouring the iron that has been dephosphorized into a ladle or similar receptacle, the same may be poured into another furnace in which has just been effected the finishing refinement of another charge the treatment of which may have been so conducted that it will have reached the last stage of the refining process at the time, when the dephosphorization in the first furnace has just been completed.

When the iron to be refined contains, besides phosphorus, other valuable substances such as chromium, manganese, molybdenum, vanadium, wolfram and the like, these substances will also be taken up into the slag during the dephosphorization treatment. All these substances may then be recovered separately or by groups, in that the above described treatment of the slag is carried out fractionally, so that the substance or substances which are most easily reduced are first recovered and then the others in succession, according to the facility with which said substances are reduced.

I claim.

1. The process of refining iron and steel, which comprises treating the iron to give off its phosphorus and other foreign substances to the slag, and then treating the slag separately to give off said substances to a charge specially destined for this purpose and treating with slag thus refined the iron from which the phosphorus has been removed.

2. The process of refining iron and steel, which comprises treating the iron to give off its phosphorus and other foreign substances to the slag, pouring off a part of the iron, treating the slag to give off its content of phosphorus and other foreign substances to the remaining charge, pouring off this latter from the slag, and treating with the refined slag the iron from which the phosphorus has been removed.

3. The process of refining iron and steel, which comprises treating the iron to give off its phosphorus and other substances to the slag, subjecting the slag separately to successive treatments in order to give off to a charge specially destined for this purpose one after the other of said substances according to the facility with which combinations of said substances are reduced or oxidized, and treating with the slag thus purified the iron from which the phosphorus has been removed.

In testimony that I claim the foregoing as my invention, I have signed my name in presence of two subscribing witnesses.

KARL ALBERT FREDRIK HIORTH.

Witnesses:
NANA PEDERSON,
MARTIN GUTLORMSEN.

---

Copies of this patent may be obtained for five cents each, by addressing the "Commissioner of Patents, Washington, D. C."